United States Patent
Wang et al.

(10) Patent No.: US 11,421,130 B2
(45) Date of Patent: *Aug. 23, 2022

(54) COATING COMPOSITION FOR EXTREME WASHABLE COATINGS COMPRISING SELF-CROSSLINKABLE CORE-SHELL PARTICLES

(71) Applicant: PPG Industries Ohio, Inc., Cleveland, OH (US)

(72) Inventors: Maria Wang, Allison Park, PA (US); Shanti Swarup, Allison Park, PA (US); Yu Wang, Pittsburgh, PA (US); Xiangling Xu, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/029,429

(22) Filed: Sep. 23, 2020

(65) Prior Publication Data

US 2021/0009852 A1      Jan. 14, 2021

Related U.S. Application Data

(63) Continuation of application No. 16/124,808, filed on Sep. 7, 2018, now Pat. No. 11,059,993.

(51) Int. Cl.
*B32B 5/16* (2006.01)
*C09D 175/14* (2006.01)
*C08L 75/14* (2006.01)
*C09D 5/02* (2006.01)
*C09D 133/08* (2006.01)
*C09D 133/10* (2006.01)
*C09D 7/42* (2018.01)
*C08K 3/34* (2006.01)
*C08K 5/05* (2006.01)

(52) U.S. Cl.
CPC ............ *C09D 175/14* (2013.01); *C08L 75/14* (2013.01); *C09D 5/02* (2013.01); *C09D 7/42* (2018.01); *C09D 133/08* (2013.01); *C09D 133/10* (2013.01); *C08K 3/346* (2013.01); *C08K 5/05* (2013.01); *C08L 2207/53* (2013.01)

(58) Field of Classification Search
CPC .......... C08G 18/7806; Y10T 428/2998; B05D 2401/20
USPC .............................. 428/407; 525/28, 540, 902
See application file for complete search history.

(56) References Cited

U.S. PATENT DOCUMENTS

| | | |
|---|---|---|
| 4,598,121 A | 7/1986 | Disteldorf et al. |
| 4,650,718 A | 3/1987 | Simpson et al. |
| 4,888,383 A | 12/1989 | Huybrechts |
| 4,933,056 A | 6/1990 | Corrigan et al. |
| 4,983,662 A | 1/1991 | Overbeek et al. |
| 5,141,983 A | 8/1992 | Hasegawa et al. |
| 5,147,926 A | 9/1992 | Meichsner et al. |
| 5,348,997 A | 9/1994 | Kato et al. |
| 5,472,996 A | 12/1995 | Hayashi et al. |
| 5,530,043 A | 6/1996 | Zawacky et al. |
| 5,571,861 A | 11/1996 | Klein et al. |
| 5,614,582 A | 3/1997 | Hori et al. |
| 5,623,016 A | 4/1997 | Klein et al. |
| 5,760,107 A | 6/1998 | Valko et al. |
| 5,814,410 A | 9/1998 | Singer et al. |
| 5,820,987 A | 10/1998 | Kaufman et al. |
| 5,891,981 A | 4/1999 | Mauer et al. |
| 5,912,293 A | 6/1999 | Stockwell et al. |
| 6,063,861 A | 5/2000 | Irle et al. |
| 6,239,209 B1 | 5/2001 | Yang et al. |
| 6,455,631 B1 | 9/2002 | Blum et al. |
| 6,555,625 B1 | 4/2003 | Overbeek et al. |
| 6,579,932 B1 | 6/2003 | Schipper et al. |
| 6,635,706 B1 | 10/2003 | Petschke et al. |
| 6,706,818 B2 | 3/2004 | Ishihara et al. |
| 6,762,240 B2 | 7/2004 | Swarup et al. |
| 6,765,056 B2 | 7/2004 | Hobel et al. |
| 7,476,705 B2 | 1/2009 | Pajerski |
| 7,531,074 B2 | 5/2009 | Purdy et al. |
| 7,576,157 B2 | 8/2009 | Pajerski |

(Continued)

FOREIGN PATENT DOCUMENTS

| | | |
|---|---|---|
| CA | 2186776 A1 | 3/1998 |
| CA | 2219835 A1 | 5/1998 |

(Continued)

OTHER PUBLICATIONS

Dow, "Coating Materials", Binders for Architectural Coatings, 2016.
Evonik, "Surfynol Surfactants", 2020, https://www.imcdus.com/surynol-surfactants/.
Hirose et al., "The structure and properties of core-shell type acrylic-polyurethane hybrid aqueous emulsions", Progress in Organic Coatings, 1997, pp. 157-169.

(Continued)

*Primary Examiner* — Hoa (Holly) Le
(74) *Attorney, Agent, or Firm* — Michael J. Grese

(57) ABSTRACT

A coating composition including: an aqueous dispersion of self-crosslinkable core-shell particles, where the core-shell particles include (1) a polymeric core at least partially encapsulated by (2) a polymeric shell having urethane linkages, keto and/or aldo functional groups, and hydrazide functional groups, where the polymeric core is covalently bonded to at least a portion of the polymeric shell, and an acrylic polymer, where the acrylic polymer is non-reactive with the polymeric core and the polymeric shell. A substrate coated with a coating formed from the coating composition and a method of improving stain resistance of a substrate are also disclosed.

20 Claims, No Drawings

(56) References Cited

U.S. PATENT DOCUMENTS

| | | | |
|---|---|---|---|
| 8,283,405 B2 | 10/2012 | Yukawa | |
| 8,436,084 B2 | 5/2013 | Kawaguchi | |
| 8,461,253 B2 | 6/2013 | Ambrose et al. | |
| 8,846,156 B2 | 9/2014 | Swarup et al. | |
| 8,900,667 B2 | 12/2014 | Boggs et al. | |
| 8,901,244 B2 | 12/2014 | Pajerski | |
| 9,102,783 B2 | 8/2015 | Yagi et al. | |
| 9,127,125 B2 | 9/2015 | Hartig et al. | |
| 9,149,835 B2 | 10/2015 | Swarup et al. | |
| 9,303,181 B2 | 4/2016 | Zhang et al. | |
| 9,365,739 B2 | 6/2016 | Dombrowski et al. | |
| 10,066,116 B2 | 9/2018 | Hibben et al. | |
| 10,081,696 B2 | 9/2018 | Chen et al. | |
| 10,577,518 B2 | 3/2020 | Xu et al. | |
| 11,059,993 B2 * | 7/2021 | Wang | C09D 5/02 |
| 2001/0024693 A1 | 9/2001 | Morimoto et al. | |
| 2004/0096590 A1 | 5/2004 | Sasaki et al. | |
| 2006/0121204 A1 | 6/2006 | Nakae et al. | |
| 2006/0148980 A1 | 7/2006 | Tielemans et al. | |
| 2009/0117396 A1 | 5/2009 | Furusawa et al. | |
| 2009/0137734 A1 | 5/2009 | Pajerski | |
| 2011/0070374 A1 | 3/2011 | Ambrose et al. | |
| 2011/0300389 A1 | 12/2011 | Kitagawa et al. | |
| 2012/0021228 A1 | 1/2012 | Kitagawa et al. | |
| 2014/0323639 A1 | 10/2014 | Zhang et al. | |
| 2014/0377468 A1 | 12/2014 | Swarup et al. | |
| 2015/0045491 A1 | 2/2015 | Zhang et al. | |
| 2015/0267077 A1 | 9/2015 | Janoski, Sr. et al. | |
| 2015/0307738 A1 | 10/2015 | Schmucker et al. | |
| 2016/0068706 A1 | 3/2016 | Swarup et al. | |
| 2016/0244629 A1 | 8/2016 | Xu et al. | |
| 2016/0264815 A1 | 9/2016 | Joege et al. | |
| 2016/0319151 A1 | 11/2016 | Steinmetz et al. | |
| 2017/0037263 A1 | 2/2017 | Iyer et al. | |
| 2017/0136493 A1 | 5/2017 | Lamers et al. | |
| 2018/0230327 A1 | 8/2018 | Kanda | |
| 2019/0002709 A1 | 1/2019 | Xu et al. | |
| 2020/0216712 A1 * | 7/2020 | Wang | C09D 175/16 |
| 2020/0290086 A1 * | 9/2020 | Xu | B05D 3/0254 |
| 2022/0081587 A1 * | 3/2022 | Wang | C09D 175/16 |

FOREIGN PATENT DOCUMENTS

| | | |
|---|---|---|
| CN | 101240101 A | 8/2008 |
| CN | 101759841 A | 6/2010 |
| CN | 102199254 A | 9/2011 |
| CN | 102492281 A | 6/2012 |
| CN | 105175661 A | 12/2015 |
| JP | 5320299 A | 12/1993 |
| JP | 5339542 A | 12/1993 |
| JP | 782456 A | 3/1995 |
| JP | 7188353 A | 7/1995 |
| JP | 7242855 A | 9/1995 |
| JP | 10139839 A | 5/1998 |
| JP | 10259356 A | 9/1998 |
| JP | 10265735 A | 10/1998 |
| JP | H10298491 A | 11/1998 |
| JP | 2000345092 A | 12/2000 |
| JP | 200140272 A | 2/2001 |
| JP | 200140319 A | 2/2001 |
| JP | 2001278923 A | 10/2001 |
| JP | 200288215 A | 3/2002 |
| JP | 2005264136 A | 9/2005 |
| JP | 200656973 A | 3/2006 |
| JP | 20081779 A | 1/2008 |
| JP | 201053340 A | 3/2010 |
| JP | 201126463 A | 2/2011 |
| JP | 2014129484 A | 7/2014 |
| WO | 9529963 A1 | 11/1995 |
| WO | 9747401 A1 | 12/1997 |
| WO | 2011127641 A1 | 10/2011 |
| WO | 2015030955 A1 | 3/2015 |
| WO | 2017158015 A1 | 9/2017 |
| WO | 2017160398 A1 | 9/2017 |
| WO | 2017180220 A1 | 10/2017 |

OTHER PUBLICATIONS

Kessel et al., "The diacetone acrylamide crosslinking reaction and its influence on the film formation of an acrylic latex", J. Coat Technol. Res., 2008, pp. 285-297, vol. 5, No. 5.

Li et al., "Synthesis and characterization of self-crosslinked polyurethane/polyactylate composite emulsion based on carbonyl-hydrazide reaction", Journal of Polymer Research, 2013, pp. 1-9, vol. 20, No. 270.

Okamoto et al., "Urethane/acrylic composite polymer emulsions", Progress in Organic Coatings, 1996, pp. 175-182, vol. 29.

Vielhauer et al., "Self-Crosslinking Acrylic and Acrylic/Polyurethane Resins for Waterborne Wood Finishes", Paint & Coatings Industry Magazine, May 2013.

Zhang et al., "The Diacetone Acrylamide Crosslinking Reaction and Its Control of Core-Shell Polyacrylate Latices at Ambient Temperature", Journal of Applied Polymer Science, 2012, pp. 1822-1832, vol. 123.

* cited by examiner

COATING COMPOSITION FOR EXTREME WASHABLE COATINGS COMPRISING SELF-CROSSLINKABLE CORE-SHELL PARTICLES

FIELD OF THE INVENTION

The present invention relates to a coating composition having an aqueous dispersion of self-crosslinkable core-shell particles and an acrylic polymer non-reactive with the core and shell of the core-shell particles, a substrate coated therewith, and a method of improving stain resistance of a substrate.

BACKGROUND OF THE INVENTION

Aqueous architectural paints, such as those covering interior walls, and other coatings commonly become stained as the result of everyday traffic in the area in which the coating composition was applied. Stain resistance refers to the resistance to stain, difficulty of being wetted by stain, difficulty of being adhered to by stain, and/or easiness of stain removal without damage to the coating (i.e. washability).

SUMMARY OF THE INVENTION

The present invention relates to a coating composition including: an aqueous dispersion of self-crosslinkable core-shell particles, where the core-shell particles include (1) a polymeric core at least partially encapsulated by (2) a polymeric shell having urethane linkages, keto and/or aldo functional groups, and hydrazide functional groups, where the polymeric core is covalently bonded to at least a portion of the polymeric shell, and an acrylic polymer, where the acrylic polymer is non-reactive with the polymeric core and the polymeric shell.

The present invention also relates to a method of improving stain resistance of a substrate including: preparing a coating composition by: preparing an aqueous dispersion of self-crosslinkable core-shell particles dispersed in an aqueous medium, where the core-shell particles include (1) a polymeric core at least partially encapsulated by (2) a polymeric shell having urethane linkages, keto and/or aldo functional groups, and hydrazide functional groups where the polymeric core is covalently bonded to at least a portion of the polymeric shell; and adding an acrylic polymer to the aqueous dispersion, the acrylic polymer, where the acrylic polymer is non-reactive with the polymeric core and the polymeric shell; and applying the coating composition to a substrate.

DESCRIPTION OF THE INVENTION

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" coating, "a" core-shell particle, and the like refer to one or more of any of these items. Also, as used herein, the term "polymer" is meant to refer to prepolymers, oligomers, and both homopolymers and copolymers. The term "resin" is used interchangeably with "polymer".

The present invention is directed to a coating composition which includes: in addition to an acrylic polymer, an aqueous dispersion of self-crosslinkable core-shell particles, wherein the core-shell particles comprise (1) a polymeric core at least partially encapsulated by (2) a polymeric shell. The polymeric shell comprises: (i) urethane linkages, (ii) keto and/or aldo functional groups, and (iii) hydrazide functional groups. The polymeric core is covalently bonded to at least a portion of the polymeric shell. The coating composition comprises an acrylic polymer. The acrylic polymer is non-reactive with the polymeric core and the polymeric shell.

As used herein, the transitional term "comprising" (and other comparable terms, e.g., "containing" and "including") is "open-ended" and open to the inclusion of unspecified matter. Although described in terms of "comprising", the terms "consisting essentially of" and "consisting of" are also within the scope of the invention.

As used herein, an "aqueous medium" refers to a liquid medium comprising at least 50 wt % water, based on the total weight of the liquid medium. Such aqueous liquid mediums can for example comprise at least 60 wt % water, or at least 70 wt % water, or at least 80 wt % water, or at least 90 wt % water, or at least 95 wt % water, or 100 wt % water, based on the total weight of the liquid medium. The solvents that, if present, make up less than 50 wt % of the liquid medium include organic solvents. Non-limiting examples of suitable organic solvents include polar organic solvents, e.g. protic organic solvents such as glycols, glycol ether alcohols, alcohols, volatile ketones, glycol diethers, esters, and diesters. Other non-limiting examples of organic solvents include aromatic and aliphatic hydrocarbons.

Further, the term "self-crosslinkable" refers to a polymeric particle having two or more functional groups that are reactive with each other and which participate in intramolecular and/or intermolecular crosslinking reactions to form a covalent linkage in the absence of any external crosslinking agent. For example, the polymeric particles of the present invention can each comprise hydrazide functional groups as well as a keto and/or aldo functional groups that can react with each other to yield hydrazone linkages. As used herein, a "crosslinking agent", "crosslinker", and like terms refers to a molecule comprising two or more functional groups that are reactive with other functional groups and which is capable of linking two or more monomers or polymer molecules through chemical bonds. It is appreciated that the self-crosslinkable core-shell particles can also react with separate crosslinking agents when present.

The aqueous dispersed core-shell particles of the coating composition include a core that is at least partially encapsulated by the shell. The polymeric core may be an acrylic core that is partially bonded to a polyurethane/polyurea shell. The shell may include a water dispersible group, so as to be dispersible in the aqueous dispersion. A core-shell particle in which the core is at least partially encapsulated by the shell refers to a particle comprising (i) at least a first material or materials that form the center of the particle (i.e., the core) and (ii) at least a second material or materials (i.e., the shell) that form a layer over at least a portion of the surface of the first material(s) (i.e., the core). It is appreciated that the first material(s) that forms the core is different from the second material(s) that forms the shell. Further, the core-shell particles can have various shapes (or morphologies) and sizes. For example, the core-shell particles can have generally spherical, cubic, platy, polyhedral, or acicular (elongated or fibrous) morphologies. The core-shell particles can also have an average particle size of 30 to 300 nanometers, or from 40 to 200 nanometers, or from 50 to 150 nanometers. As used herein, "average particle size" refers to volume average particle size. The average particle size can for example be determined with a Zetasize 3000HS following the instructions in the Zetasize 3000HS manual.

The polymeric core typically comprises an addition polymer derived from ethylenically unsaturated monomers. The ethylenically unsaturated monomers can comprise a (meth) acrylate monomer, a vinyl monomer, or a combination thereof. As such, the polymeric core can comprise a (meth) acrylate polymer, a vinyl polymer, or a combination thereof. As used herein, the term "(meth)acrylate" refers to both the methacrylate and the acrylate. Moreover, the backbone, or main chain, of a polymer or polymers that form at least a portion of the polymeric shell can comprise urea linkages and/or urethane linkages and may optionally further comprise other linkages. For instance, the polymeric shell can comprise a polyurethane with a backbone that includes urethane linkages and urea linkages. As indicated, the polymeric shell can also comprise additional linkages including, but not limited to, ester linkages, ether linkages, and combinations thereof.

The polymeric core and/or polymeric shell can also comprise one or more, such as two or more, reactive functional groups. The term "reactive functional group" refers to an atom, group of atoms, functionality, or group having sufficient reactivity to form at least one covalent bond with another co-reactive group in a chemical reaction. At least some of the reactive functional groups of the polymeric shell are keto functional groups (also referred to as ketone functional groups) and/or aldo functional groups (also referred to as aldehyde functional groups) as well as hydrazide functional groups. Optionally, the polymeric core also comprises reactive functional groups such as keto functional groups, aldo functional groups, or combinations thereof. Alternatively, the polymer core is completely free of reactive functional groups such as keto functional groups and aldo functional groups.

Other non-limiting examples of additional reactive functional groups that can be present on the polymeric shell and/or the polymeric core include carboxylic acid groups, amine groups, epoxide groups, hydroxyl groups, thiol groups, carbamate groups, amide groups, urea groups, isocyanate groups (including blocked isocyanate groups), ethylenically unsaturated groups, and combinations thereof. As used herein, "ethylenically unsaturated" refers to a group having at least one carbon-carbon double bond. Non-limiting examples of ethylenically unsaturated groups include, but are not limited to, (meth)acrylate groups, vinyl groups, and combinations thereof. It is appreciated that the polymeric shell, polymeric core, or both, can be completely free of (i.e., does not contain) any of the additional reactive functional groups.

The polymeric core and polymeric shell of the core-shell particles can be prepared to provide a hydrophilic polymeric shell with enhanced water-dispersibility/stability and a hydrophobic polymeric core. As used herein, the term "hydrophilic" refers to polymers, monomers, and other materials that have an affinity for water and which will disperse or dissolve in water or other aqueous-based mediums having a pH greater than 5 at ambient temperature (20° C.-27° C.). Hydrophilic materials, such as hydrophilic polymers, typically have water-dispersible groups. A "water-dispersible group" refers to a group having or formed from one or more hydrophilic functional groups that have an affinity for water and which help disperse a compound, such as a polymer, in water or other aqueous based mediums. Further, as used herein, the term "hydrophobic" refers to polymers, monomers, and other materials that lack an affinity for water or other aqueous based mediums and tend to repel, not dissolve or disperse in, and/or not be wetted by water or other aqueous based mediums. Hydrophobic materials, such as hydrophobic polymers, are often completely free of water-dispersible groups.

As indicated, the polymeric core and polymeric shell of the core-shell particles can be prepared to provide a hydrophilic polymeric shell with enhanced water-dispersibility/stability and a hydrophobic polymeric core. Thus, the polymeric shell can comprise hydrophilic water-dispersible groups while the polymeric core can be completely free of hydrophilic water-dispersible groups. The hydrophilic water-dispersible groups can increase the water-dispersibility/stability of the polymeric shell in the aqueous medium so that the polymeric shell at least partially encapsulates the hydrophobic core.

As previously described, the water-dispersible groups comprise one or more hydrophilic functional groups. For example, the polymer(s) that form the hydrophilic polymeric shell can comprise ionic or ionizable groups such as acid groups like carboxylic acid functional groups or salts thereof. Carboxylic acid functional group could for example be introduced by using a carboxylic acid group containing diol to form the polymeric shell. The acid groups such as carboxylic acid functional groups can be at least partially neutralized (i.e., at least 30% of the total neutralization equivalent) by an inorganic base, such as a volatile amine, to form a salt group. A volatile amine refers as an amine compound having an initial boiling point of less than or equal to 250° C. as measured at a standard atmospheric pressure of 101.3 kPa. Examples of suitable volatile amines are ammonia, dimethylamine, trimethylamine, monoethanolamine, and dimethylethanolamine. It is appreciated that the amines will evaporate during the formation of the coating to expose the acid groups such as carboxylic acid functional groups and allow the acid groups such as carboxylic acid functional groups to undergo further reactions such as with a crosslinking agent reactive with the acid groups or carboxylic acid functional groups. Other non-limiting examples of water-dispersible groups include polyoxyalkylene groups such as by using polyethylene/propylene glycol ether materials for example.

In some examples, the polymeric shell is formed from (i) polyurethanes comprising pendant and/or terminal keto and/or aldo functional groups as well as pendant and/or terminal carboxylic acid functional groups, and (ii) polyurethanes comprising pendant and/or terminal hydrazide functional groups as well as pendant and/or terminal carboxylic acid functional groups. As previously described, the carboxylic acid functional groups can be at least partially neutralized (i.e., at least 30% of the total neutralization equivalent) by an inorganic base, such as a volatile amine, to form a salt group as previously described. Further, the polymeric core can be a hydrophobic core that is completely free of such carboxylic acid groups and salt groups formed therefrom. A "pendant group" refers to a group that is an offshoot from the side of the polymer backbone and which is not part of the polymer backbone. In contrast, a "terminal group" refers to a group on an end of the polymer backbone and which is part of the polymer backbone.

The polymeric shell may include a fluorine-containing group and/or a silicon-containing group bonded to the polymeric shell. The fluorine-containing group and/or the silicon-containing group may be co-polymerized with the polymeric core and also bonded to the polymeric shell. Examples of such fluorine-containing groups and/or a silicon-containing groups include: fluorofunctional acrylate (methacrylate), such as: trideca fluoro octy methacrylate, tridodecafluoro octyl methacrylate, and polydimethyl silicone acrylate (methacrylate) (such as those available in varying molecular weights from Shin-Etsu Chemical (Tokyo, Japan)). The fluorine-containing group and/or the silicon-containing group may be linearly bonded on the polymeric shell. Examples of such fluorine-containing group and/or a silicon-containing groups include: ethoxylated polydimethyl siloxane (e.g., SILSURF A008-UP from Siltech Corporation (Toronto, Canada)) and Capstone AL62 from The Chemours Company (Wilmington, Del.). Use of fluorine-containing groups and/or the silicon-containing groups may improve stain resistance of the coating formed from the coating composition due to their hydrophobic characteristics.

The polymeric shell is also covalently bonded to at least a portion of the polymeric core. For example, the polymeric shell can be covalently bonded to the polymeric core by reacting at least one functional group on the monomers and/or prepolymers that are used to form the polymeric shell with at least one functional group on the monomers and/or prepolymers that are used to form the polymeric core. The functional groups can include any of the functional groups previously described provided that at least one functional group on the monomers and/or prepolymers that are used to form the polymeric shell is reactive with at least one functional group on the monomers and/or prepolymers that are used to form the polymeric core. For instance, the monomers and/or prepolymers that are used to form the polymeric shell and polymeric core can both comprise at least one ethylenically unsaturated group that are reacted with each other to form a chemical bond. As used herein, a "prepolymer" refers to a polymer precursor capable of further reactions or polymerization by one or more reactive groups to form a higher molecular mass or cross-linked state.

Various components can be used to form the core-shell particles of the present invention. For example, the core-shell particles can be formed from isocyanate functional polyurethane prepolymers, polyamines, hydrazide functional compounds, and ethylenically unsaturated monomers. The isocyanate functional polyurethane prepolymers can be prepared according to any method known in the art, such as by reacting at least one polyisocyanate with one or more compound(s) having functional groups that are reactive with the isocyanate functionality of the polyisocyanate. Reactive functional groups can be active hydrogen-containing functional groups such as hydroxyl groups, thiol groups, amine groups, hydrazide groups, and acid groups like carboxylic acid groups. A hydroxyl group may, for example, react with an isocyanate group to form a urethane linkage. A primary or secondary amine group may react with an isocyanate group to form a urea linkage. Examples of suitable compounds that can be used to form the polyurethane include, but are not limited to, polyols, polyisocyanates, compounds containing one or more carboxylic acid groups, such as diols containing one or more carboxylic acid groups, polyamines, hydroxyl functional ethylenically unsaturated components, such as hydroxyalkyl esters of (meth)acrylic acid, and/or other compounds having reactive functional groups, such as hydroxyl groups, thiol groups, amine groups, and carboxylic acid groups. The polyurethane prepolymer can also be prepared with keto and/or aldo functional monoalcohols.

Non-limiting examples of suitable polyisocyanates include isophorone diisocyanate (IPDI), dicyclohexylmethane 4,4'-diisocyanate (H12MDI), cyclohexyl diisocyanate (CHDI), m-tetramethylxylylene diisocyanate (m-TMXDI), p-tetramethylxylylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), toluene diisocyanate (TDI), m-xylylenediisocyanate (MXDI) and p-xylylenediisocyanate, 4-chloro-1,3-phenylene diisocyanate, 1,5-tetrahydro-naphthalene diisocyanate, 4,4'-dibenzyl diisocyanate, and 1,2,4-benzene triisocyanate, xylylene diisocyanate (XDI), and mixtures or combinations thereof.

Examples of polyols that can be used to prepare a polyurethane based polymer such as the polyurethane prepolymer include, but are not limited to, lower molecular weight glycols (less than 5,000 number average molecular weight (Mn)), polyether polyols, polyester polyols, copolymers thereof, and combinations thereof. As reported herein, Mn is measured by gel permeation chromatography using a polystyrene standard according to ASTM D6579-11 (performed using a Waters 2695 separation module with a Waters 2414 differential refractometer (RI detector); tetrahydrofuran (THF) was used as the eluent at a flow rate of 1 ml/min, and two PLgel Mixed-C (300×7.5 mm) columns were used for separation at the room temperature; weight and number average molecular weight of polymeric samples can be measured by gel permeation chromatography relative to linear polystyrene standards of 800 to 900,000 Da) Non-limiting examples of low molecular weight glycols include ethylene glycol, diethylene glycol, triethylene glycol, 1,2-propylene glycol, 1,3-butylene glycol, tetramethylene glycol, hexamethylene glycol, and combinations thereof, as well as other compounds that comprise two or more hydroxyl groups and combinations of any of the foregoing. Non-limiting examples of suitable polyether polyols include polytetrahydrofuran, polyethylene glycol, polypropylene glycol, polybutylene glycol, and combinations thereof. Non-limiting examples of polyester polyols include those prepared from a polyol comprising an ether moiety and a carboxylic acid or anhydride.

Other suitable polyols include, but are not limited to, cyclohexanedimethanol, 2-ethyl-1,6-hexanediol, 1,3-propanediol, 1,4-butanediol, neopentyl glycol, trimethylol propane, 1,2,6-hexantriol, glycerol, and combinations thereof. Further, suitable amino alcohols that can be used include, but are not limited to, ethanolamine, propanolamine, butanolamine, and combinations thereof.

Suitable carboxylic acids, which can be reacted with the polyols to form a polyester polyol, include, but are not limited to, diacids such as glutaric acid, succinic acid, malonic acid, oxalic acid, phthalic acid, isophthalic acid, hexahydrophthalic acid, adipic acid, maleic acid, and mixtures thereof. Further, non-limiting examples of acid containing diols include, but are not limited to, 2,2-bis(hydroxymethyl)propionic acid, which is also referred to as dimethylolpropionic acid (DMPA), 2,2-bis(hydroxymethyl) butyric acid, which is also referred to as dimethylol butanoic acid (DMBA), diphenolic acid, and combinations thereof.

Non-limiting examples of hydrazide functional materials that can be used in the preparation of the polyurethane prepolymer and to provide hydrazide functionality include dihydrazide functional compounds such as, but not limited to, maleic dihydrazide, fumaric dihydrazide, itaconic dihydrazide, phthalic dihydrazide, isophthalic dihydrazide, terephthalic dihydrazide, trimellitic trihydrazide, oxalic dihydrazide, adipic acid dihydrazide, sebacic dihydrazide, and combinations thereof.

Examples of keto functional monoalcohols that can be used in the preparation of the polyurethane prepolymer and to provide keto and/or aldo functionality include, but are not limited to, hydroxyacetone, 4-hydroxy-2-butanone, 5-hydroxy-4-octanone, 4-hydroxy-4-methylpentan-2-one, which is also referred to as diacetone alcohol, 3-hydroxyacetophenone, and combinations thereof. Further, non-limiting examples of aldo functional monoalcohols include DL-lactaldehyde solution, 3-hydroxy-butanal, 4-hydroxy-pentanal, 5-hydroxy-hexanal, 5-hydroxy-5-methylhexanal, 4-hydroxy-4-methyl-pentanal, 3-hydroxy-3-methylbutanal, and combinations thereof.

Non-limiting examples of compounds, which can be used to incorporate ethylenically unsaturated moieties to the polyurethane prepolymer, include hydroxyalkyl esters of (meth)acrylic acid such as hydroxymethyl (meth)acrylate, hydroxyethyl (meth)acrylate, hydroxypropyl (meth)acrylate, hydroxybutyl (meth)acrylate, and combinations thereof.

The components that form the polyurethane prepolymer can be reacted in a stepwise manner, or they can be reacted simultaneously. For example, the polyurethane prepolymer can be formed by reacting a diisocyanate, a polyol, a carboxyl group-containing diol, a hydroxyl group-containing ethylenically unsaturated monomer, and a dihydrazide functional compound.

As previously mentioned, the core-shell particles can also be prepared with polyamines and ethylenically unsaturated monomers not incorporated into the polyurethane during preparation thereof. For instance, the isocyanate functional polyurethane prepolymers can be prepared as described above and then reacted with polyamines as a chain extender. As used herein, a "chain extender" refers to a lower molecular weight (compound having a Mn less than 1,000) compound having two or more functional groups that are reactive towards isocyanate.

Suitable polyamines that can be used to prepare the polyurethane based polymer include aliphatic and aromatic compounds, which comprise two or more amine groups selected from primary and secondary amine groups. Examples include, but are not limited to, diamines such as, for example, ethylenediamine, hexamethylenediamine, 1,2-propanediamine, 2-methyl-1,5-penta-methylenediamine, 2,2,4-trimethyl-1,6-hexanediamine, isophoronediamine, diaminocyclohexane, xylylenediamine, 1,12-diamino-4,9-dioxadodecane, and combinations thereof. Suitable polyamines are also sold by Huntsman Corporation (The Woodlands, Tex.) under the trade name JEFFAMINE, such as JEFFAMINE D-230 and JEFFAMINE D-400.

Other non-limiting examples of suitable polyamine functional compounds include the Michael addition reaction products of a polyamine functional compound, such as a diamine, with keto and/or aldo containing ethylenically unsaturated monomers. The polyamine functional compound typically comprises at least two primary amino groups (i.e., a functional group represented by the structural formula $-NH_2$), and the keto and/or aldo containing unsaturated monomers include, but are not limited to, (meth) acrolein, diacetone (meth)acrylamide, diacetone (meth) acrylate, acetoacetoxyethyl (meth)acrylate, vinyl acetoacetate, crotonaldehyde, 4-vinylbenzaldehyde, and combinations thereof. The resulting Michael addition reaction products can include a compound with at least two secondary amino groups (i.e., a functional group represented by the structural formula $-NRH$ in which R is a hydrocarbonyl) and at least two keto and/or aldo functional groups. It is appreciated that the secondary amino groups will react with the isocyanate functional groups of the polyurethane prepolymers to form urea linkages and chain extend the polyurethanes. Further, the keto and/or aldo functional groups will extend out from the backbone of the chain-extended polyurethane, such as from the nitrogen atom of the urea linkage, for example, to form a polyurethane with pendant keto and/or aldo functional groups.

As indicated, and in accordance with the present invention, the aqueous dispersion includes core-shell particles that have a polymeric shell comprising keto and/or aldo functional groups as well as hydrazide functional groups. The polymeric shell of such core-shell particles can be prepared with hydrazide functional polymers and keto and/or aldo functional polymers or polymers that contain both hydrazide functionality and keto and/or aldo functionality. The polymers can also include additional functional groups as previously described including, but not limited to, ethylenically unsaturated groups. For example, the polymeric shell of such core-shell particles can be prepared with: (i) a first polyurethane comprising urethane linkages, water-dispersible groups such as carboxylic acid groups, ethylenically unsaturated groups, and hydrazide groups; and (ii) a second polyurethane comprising urethane linkages, water-dispersible groups such as carboxylic acid groups, ethylenically unsaturated groups, keto and/or aldo groups, and, optionally, urea linkages.

Moreover, the first and second polyurethanes can be prepared with the previously described components. For instance, the first polyurethane can be prepared by reacting an isocyanate and ethylenically unsaturated functional polyurethane with a dihydrazide functional compound such as adipic acid dihydrazide. The second polyurethane can be prepared, for example, by reacting and chain extending isocyanate and ethylenically unsaturated functional polyurethanes with the Michael addition reaction product of a diamine and keto and/or aldo containing ethylenically unsaturated monomers. The isocyanate and ethylenically unsaturated functional polyurethanes used to form the first and second polyurethanes can be formed from polyols, polyisocyanates, diols containing carboxylic acid functionality, and hydroxyl functional ethylenically unsaturated components.

After forming the polyurethane(s) (for example, the first and second polyurethanes previously described), the polyurethane(s) and additional ethylenically unsaturated monomers can be subjected to a polymerization process to form the core-shell particles. The additional ethylenically unsaturated monomers can be added after forming the polyurethane(s). Alternatively, the additional ethylenically unsaturated monomers can be used as a diluent during preparation of the polyurethane(s) and not added after formation of the polyurethane(s). It is appreciated that ethylenically unsaturated monomers can be used as a diluent during preparation of the polyurethane(s) and also added after formation of the polyurethane(s).

The additional ethylenically unsaturated monomers can comprise multi-ethylenically unsaturated monomers, mono-ethylenically unsaturated monomers, or combinations thereof. A "mono-ethylenically unsaturated monomer" refers to a monomer comprising only one ethylenically unsaturated group, and a "multi-ethylenically unsaturated monomer" refers to a monomer comprising two or more ethylenically unsaturated groups.

Non-limiting examples of ethylenically unsaturated monomers include, but are not limited to, alkyl esters of (meth)acrylic acid, hydroxyalkyl esters of (meth)acrylic acid, acid group containing ethylenically unsaturated monomers, vinyl aromatic monomers, aldo or keto containing ethylenically unsaturated monomers, and combinations thereof.

Non-limiting examples of alkyl esters of (meth)acrylic acid include methyl (meth)acrylate, ethyl (meth)acrylate, butyl (meth)acrylate, isobutyl (meth)acrylate, ethylhexyl (meth)acrylate, lauryl (meth)acrylate, octyl (meth)acrylate, glycidyl (meth)acrylate, isononyl (meth)acrylate, isodecyl (meth)acrylate, vinyl (meth)acrylate, acetoacetoxyethyl (meth)acrylate, acetoacetoxypropyl (meth)acrylate, and combinations thereof. Other non-limiting examples include di(meth)acrylate alkyl diesters formed from the condensation of two equivalents of (meth)acrylic acid such as, for example, ethylene glycol di(meth)acrylate. Di(meth)acrylate alkyl diesters formed from $C_{2-24}$ diols such as butane diol and hexane diol can also be used.

Non-limiting examples of hydroxyalkyl esters of (meth)acrylic acid and keto and aldo containing ethylenically unsaturated monomers include any of those previously described. Non-limiting examples of acid group containing ethylenically unsaturated monomers include (meth)acrylic acid, itaconic acid, maleic acid, fumaric acid, crotonic acid, aspartic acid, malic acid, mercaptosuccinic acid, and combinations thereof.

Non-limiting examples of vinyl aromatic monomers include styrene, 2,4-dimethylstyrene, ethylstyrene, isopropylstyrene, butylstyrene, vinyl naphthalene, vinyl toluene, divinyl aromatic monomers, such as divinyl benzene, and combinations thereof.

As previously noted, the ethylenically unsaturated monomers can be polymerized in the presence of the polyurethane(s), which can also contain ethylenically unsaturated groups, to form the core-shell particles. The polymerization can be conducted using art recognized techniques as well as conventional additives such as emulsifiers, protective colloids, free radical initiators, and chain transfer agents known in the art.

Thus, in some examples, the core-shell particles of the present invention are prepared with: (i) ethylenically unsaturated monomers; (ii) a first polyurethane comprising urethane linkages, carboxylic acid groups, ethylenically unsaturated groups, and hydrazide groups; and (iii) a second polyurethane comprising urethane linkages, urea linkages, carboxylic acid groups, ethylenically unsaturated groups, and keto and/or aldo groups. The resulting core-shell particles then comprise a polymeric core prepared from ethylenically unsaturated monomers, thus for example comprising an addition polymer formed by free radical polymerization from a monomer component that may comprise any of the ethylenically unsaturated monomers previously mentioned, that is covalently bonded to at least a portion of a polyurethane shell having pendant carboxylic acid functional groups, pendant or terminal keto and/or aldo functional groups, hydrazide functional groups, urethane linkages, and urea linkages. For enhanced water-dispersibility/stability, the carboxylic acid functional groups on the polymeric shell can be at least partially neutralized (i.e., at least 30% of the total neutralization equivalent) by an inorganic base, such as a volatile amine, to form a salt group as previously described. The polymeric core can also include pendant and/or terminal functional groups, such as keto and/or aldo functional groups, by using ethylenically unsaturated monomers that contain additional functional groups such as acid group containing ethylenically unsaturated monomers and/or aldo or keto containing ethylenically unsaturated monomers as indicated above. Alternatively, the polymeric core can be completely free of additional functional groups such as completely free of keto and/or aldo functional groups. Further, the polymeric core is covalently bonded to at least a portion of the polymeric shell after polymerization of the monomers and polyurethane(s).

The polymeric core of the core-shell particle may have a Tg of from 0° C. to 50° C., such as from 0° C. to 40° C., from 20° C. to 40° C., from 20° C. to 30° C., from 30° C. to 50° C., from 30° C. to 40° C., or from 40° C. to 50° C., as measured by differential scanning calorimetry according to ASTM D3418-15. The Tg referred to in this paragraph refers to the Tg of the polymeric core of the core-shell particle before encapsulation by the polymeric shell.

It is appreciated that the core-shell particles described herein are dispersed in an aqueous medium to form a latex. As used herein, a "latex", with respect to the aqueous dispersed core-shell particles, refers to an aqueous colloidal dispersion of polymeric particles.

In addition to the above-described aqueous dispersion of self-crosslinkable core-shell particles, the coating composition includes an acrylic polymer prepared from an acrylic monomer. Suitable acrylic monomers for forming the acrylic polymer include t-butylamino methyl (meth)acrylate, (meth)acrylic acid, methyl (meth)acrylate, ethyl (meth)acrylate, butyl (meth)acrylate, hydroxyethyl (meth)acrylate, hydroxybutyl (meth)acrylate, hydroxypropyl (meth)acrylate or combinations thereof. The acrylic polymer is non-reactive with the polymeric core and polymeric shell of the self-crosslinkable core-shell particles. The acrylic polymer may be added to the aqueous dispersion after the formation of the self-crosslinkable core-shell particles.

The coating composition including the self-crosslinkable core-shell particles and the acrylic polymer may include the self-crosslinkable core-shell particles in an amount of at least 10 wt %, at least 20 wt %, at least 30 wt %, or at least 40 wt % of the resin blend, based on total resin solids weight. The self-crosslinkable core-shell particles can include up to 50 wt %, up to 40 wt %, up to 30 wt %, or up to 20 wt % of the resin blend, based on total resin solids weight. The self-crosslinkable core-shell particles can also include a range such as from 10 to 50 wt %, or from 10 to 40 wt %, or from 20 to 30 wt %, or from 20 to 50 wt %, or from 20 to 40 wt %, or from 30 to 50 wt %, or from 30 to 40 wt %, or from 40 to 50 wt % of the resin blend, based on total resin solids weight.

The coating composition including the self-crosslinkable core-shell particles and the acrylic polymer may include the acrylic polymer in an amount of at least 50 wt %, at least 60 wt %, at least 70 wt %, or at least 80 wt % of the resin blend, based on total resin solids weight. The acrylic polymer can include up to 90 wt %, up to 80 wt %, up to 70 wt %, or up to 60 wt % of the resin blend, based on total resin solids weight. The acrylic polymer can also include a range such as from 50 to 90 wt %, or from 50 to 80 wt %, or from 50 to 70 wt %, or from 50 to 60 wt %, or from 60 to 90 wt %, or from 60 to 80 wt %, or from 60 to 70 wt %, or from 70 to 90 wt %, or from 70 to 80 wt %, or from 80 to 90 wt % of the resin blend, based on total resin solids weight.

The coating composition may optionally also comprise additional components. For example, the coating composition can also comprise non-self-crosslinkable core-shell particles. As used herein, "non-self-crosslinkable" refers to a polymeric particle having one or more functional groups that are not reactive with each other and which thus requires one or more external crosslinking agents to undergo a crosslinking reaction. The non-self-crosslinkable core-shell particles can for example include a polymeric core comprising: (i) residues from ethylenically unsaturated monomers such as (meth)acrylate monomers, vinyl monomers, or a combination thereof and therefore comprise an addition polymer such as a (meth)acrylate polymer, a vinyl polymer, or a combination thereof; and (ii) keto and/or aldo functional groups. Moreover, the backbone or main chain of the polymer(s) that forms at least a portion of the polymeric shell can comprise urethane linkages and, optionally, other linkages such as for example ester linkages, ether linkages, and combinations thereof. Thus, the polymeric core can comprise keto and/or aldo functional groups, and the polymeric shell can comprise a polyurethane(s) that is completely free of keto and/or aldo functional groups and, optionally, completely free of urea linkages. Further, both the polymeric core and the polymeric shell may be completely free of hydrazide functional groups. It is appreciated that such non-self-crosslinkable core-shell particles can be prepared with similar materials as described above with respect to the self-crosslinkable core-shell particles.

The non-self-crosslinkable core-shell particles can also include a polymeric core comprising an addition polymer such as a (meth)acrylate polymer, a vinyl polymer, or a combination thereof that is derived from ethylenically unsaturated monomers such as (meth)acrylate monomers, vinyl monomers, or a combination thereof, and a polymeric shell comprising urethane linkages, water-dispersible groups such as carboxylic acid groups, ethylenically unsaturated groups, keto and/or aldo groups, and, optionally, urea linkages. Moreover, the backbone or main chain of the polymer(s) that forms at least a portion of the polymeric shell can, optionally, comprise other linkages such as ester linkages, ether linkages, and combinations thereof. The resulting core-shell particles then comprise a polymeric core prepared from ethylenically unsaturated monomers that is covalently bonded to at least a portion of a polyurethane shell having pendant carboxylic acid functional groups, pendant or terminal keto and/or aldo functional groups, urethane linkages, and, optionally, urea linkages. For enhanced water-dispersibility/stability, the carboxylic acid functional groups on the polymeric shell can be at least partially neutralized (i.e., at least 30% of the total neutralization equivalent) by an inorganic base, such as a volatile amine, to form a salt group as previously described. The polymeric core can also include pendant and/or terminal functional groups, such as keto and/or aldo functional groups, by using ethylenically unsaturated monomers that contain additional functional groups as discussed above with respect to the self-crosslinkable core-shell particles. Alternatively, the polymeric core can be completely free of additional functional groups such as keto and/or aldo functional groups. Further, both the polymeric core and the polymeric shell can be completely free of hydrazide functional groups. It is appreciated that such core-shell particles can be prepared with similar materials as described above with respect to the self-crosslinkable core-shell particles.

The non-self-crosslinkable core-shell particles can comprise at least 0.1 wt %, at least 1 wt %, at least 2 wt %, at least 5 wt %, or at least 10 wt % of the resin blend, based on total resin solids weight. The non-self-crosslinkable core-shell particles can comprise up to 40 wt %, up to 30 wt %, or up to 20 wt % of the resin blend, based on total resin solids weight. The non-self-crosslinkable core-shell particles can also comprise a range such as from 0.1 to 40 wt %, or from 1 to 30 wt %, or from 2 to 20 wt % of the resin blend, based on total resin solids weight.

The coating composition can also comprise one or more crosslinkers. For instance, the coating composition according to the present invention may comprise at least one crosslinker that is reactive with the functionality on the non-self crosslinkable core-shell particles described above and/or the optional additional film-forming resins further described herein. Non-limiting examples of crosslinkers include polyhydrazides, carbodiimides, polyols, phenolic resins, epoxy resins, beta-hydroxy (alkyl) amide resins, hydroxy (alkyl) urea resins, oxazolines, alkylated carbamate resins, (meth)acrylates, isocyanates, blocked isocyanates, polyacids, anhydrides, organometallic acid-functional materials, polyamines, polyamides, aminoplasts, aziridines, and combinations thereof.

The crosslinker(s) can react with the core-shell particles to help cure the coating composition. The terms "curable", "cure", and the like, mean that at least a portion of the resinous materials in a composition is crosslinked or crosslinkable. Cure, or the degree of cure, can be determined by dynamic mechanical thermal analysis (DMTA) using a Polymer Laboratories MK III DMTA analyzer conducted under nitrogen. The degree of cure can for example be at least 10%, such as at least 30%, such as at least 50%, such as at least 70%, or at least 90% of complete crosslinking as determined by the analysis mentioned above.

Further, curing can occur at ambient conditions, with heat, or with other means such as actinic radiation. "Ambient conditions" as used herein refers to the conditions of the surrounding environment such as the temperature, humidity, and pressure of the room or outdoor environment. For example, the coating composition can be cured at ambient room temperature (20° C.-27° C.). Further, the term "actinic radiation" refers to electromagnetic radiation that can initiate chemical reactions. Actinic radiation includes, but is not limited to, visible light, ultraviolet (UV) light, infrared and near-infrared radiation, X-ray, and gamma radiation.

The coating composition can comprise at least one crosslinker that is reactive with: (i) the keto and/or aldo functional groups or the hydrazide functional groups on the polymeric shell of the self-crosslinkable core-shell particles; and/or (ii) the keto and aldo functional groups on the polymeric core and/or shell of the non-self-crosslinkable core-shell particles when present. The crosslinker can also react with functional groups such as keto and aldo functional groups that can be present on the polymeric core of the self-crosslinkable core-shell particles. For instance, the coating composition can comprise a polyhydrazide that is reactive with the keto and/or aldo functional groups on the polymeric shell of the non-self-crosslinkable core-shell particles and keto and/or aldo functional groups on the polymeric shell of the self-crosslinkable core-shell particles. The polyhydrazides can include non-polymeric polyhydrazides, polymeric polyhydrazides, or combinations thereof. Non-limiting examples of suitable non-polymeric polyhydrazides include the dihydrazide functional compounds previously described.

The polymeric polyhydrazides can include various types of polymers comprising two or more hydrazide functional groups. For example, the polymeric polyhydrazide can comprise a polyurethane having two or more hydrazide groups. The polyhydrazide functional polyurethane can be prepared by first forming a water-dispersible isocyanate functional polyurethane prepolymer. Such water-dispersible isocyanate functional polyurethane prepolymers can for example be prepared by reacting polyols, isocyanates, and, optionally, compounds containing carboxylic acids such as diols containing carboxylic acid groups, and/or polyamines. Non-limiting examples of these compounds include any of those previously described with respect to the polyurethane prepolymer of the core-shell particles.

It is appreciated that the isocyanate functional polyurethane prepolymer used to prepare the polyhydrazide functional polyurethane can include additional functional groups. For instance, the isocyanate functional polyurethane prepolymer can also include any of the reactive functional groups previously described such as carboxylic acid groups that can be at least partially neutralized by an inorganic base to form a salt group and enhance the water-dispersibility/stability of the polyurethane. The polyurethane prepolymer can also be completely free of any of the additional functional groups. Further, the isocyanate functional polyurethane prepolymer can include additional linkages other than urethanes including, but not limited to, ether linkages, ester linkages, urea linkages, and any combination thereof.

After forming the water-dispersible isocyanate functional polyurethane prepolymer, the polyurethane prepolymer is reacted with one or more hydrazine and/or polyhydrazide compound(s) to form a water-dispersible polyhydrazide functional polyurethane. The hydrazine and polyhydrazide compounds can also chain extend the isocyanate functional polyurethane prepolymer. Non-limiting examples of polyhydrazide compounds that can be reacted with the isocyanate functional polyurethane prepolymer include any of the non-polymeric hydrazide functional compounds previously described.

The polymeric polyhydrazides can also comprise core-shell particles comprising a polymeric core at least partially encapsulated by a polymeric shell having two or more hydrazide functional groups. The polyhydrazide functional core-shell particles can be prepared by reacting polyurethane prepolymers having isocyanate and ethylenically unsaturated functional groups with hydrazine and/or polyhydrazide compounds and ethylenically unsaturated monomers and/or polymers. In some examples, the polyhydrazide functional core-shell particles are prepared by reacting polyurethane prepolymers having isocyanate and ethylenically unsaturated groups with hydrazine and/or polyhydrazide compounds to form polyurethanes having hydrazide and ethylenically unsaturated groups. The polyurethanes having hydrazide and ethylenically unsaturated groups are then polymerized in the presence of ethylenically unsaturated monomers and/or polymers to form the core-shell particles. The resulting core-shell particles will comprise a polymeric core prepared from ethylenically unsaturated monomers and/or polymers that are covalently bonded to at least a portion of a polyurethane shell having hydrazide functional groups and urethane linkages. The polymeric shell can also comprise additional functional groups (for example, carboxylic acid functional groups) and/or linkages (for example, ester linkages and/or ether linkages) as previously described with respect to polyurethane shells. The hydrazide functional core-shell particles can be also completely free of additional functional groups and linkages such as any of those previously described herein. It is appreciated that the hydrazide functional core-shell particles that can be used as a crosslinker are completely free of keto and aldo functional groups.

The coating composition can also comprise at least two different types of crosslinkers that are reactive with the functional groups that may be present on the core-shell particles such as keto and/or aldo functional groups, hydrazide groups and/or carboxylic acid functional groups. In some examples, the coating composition comprises a polyhydrazide reactive with the keto and/or aldo functional group, such as any of those previously described, and a carbodiimide reactive with carboxylic acid functional groups. Non-limiting examples of suitable carbodiimides are described in U.S. Patent Application Publication No. 2011/0070374 at paragraphs [0006] to [0105], which is incorporated by reference herein.

In addition, the coating composition can comprise additional materials including, but not limited to, additional resins such as additional film-forming resins. As used herein, a "film-forming resin" refers to a resin that when used in a coating composition can form a self-supporting continuous film on at least a horizontal surface through dehydration and/or upon curing. The term "dehydration" refers to the removal of water and/or other solvents. It is appreciated that dehydration can also cause at least partial curing of a resinous material such as the core-shell particles and additional resins described herein. The coating composition comprising the additional resin can be dehydrated and/or cured at ambient conditions, with heat, or with other means such as actinic radiation as previously described.

The additional resin can include any of a variety of thermoplastic and/or thermosetting film-forming resins known in the art. The term "thermosetting" refers to resins that "set" irreversibly upon curing or crosslinking, wherein the polymer chains of the resins are joined together by covalent bonds. Once cured or crosslinked, a thermosetting resin will not melt upon the application of heat and is insoluble in solvents. As noted, the film-forming resin can also include a thermoplastic film-forming resin. The term "thermoplastic" refers to resins that are not joined by covalent bonds and, thereby, can undergo liquid flow upon heating and can be soluble in certain solvents.

Non-limiting examples of suitable additional resins include polyurethanes other than those previously described, polyesters such as polyester polyols, polyamides, polyethers, polysiloxanes, fluoropolymers, polysulfides, polythioethers, polyureas, (meth)acrylic resins, epoxy resins, vinyl resins, and combinations thereof. The additional resins can also include non-particulate resins.

The additional resin can have any of a variety of reactive functional groups including, but not limited to, carboxylic acid groups, amine groups, epoxide groups, hydroxyl groups, thiol groups, carbamate groups, amide groups, urea groups, isocyanate groups (including blocked isocyanate groups), (meth)acrylate groups, and combinations thereof. Thermosetting coating compositions typically comprise a crosslinker that may be selected from any of the crosslinkers known in the art to react with the functionality of the resins used in the coating compositions. The crosslinkers can include any of those previously described. Alternatively, a thermosetting film-forming resin can be used having functional groups that are reactive with themselves; in this manner, such thermosetting resins are self-crosslinking.

The coating composition can also include other additional materials such as a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example colorants include pigments (organic or inorganic), dyes, and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof. The terms "pigment" and "colored filler" can be used interchangeably.

Example dyes include, but are not limited to, those that are solvent and/or aqueous based such as phthalo green or blue, iron oxide, and bismuth vanadate.

Example tints include, but are not limited to, pigments dispersed in water-based or water miscible carriers such as AQUA-CHEM 896 commercially available from Evonik Industries (Essen, Germany), CHARISMA COLORANTS and MAXITONER INDUSTRIAL COLORANTS commercially available from Accurate Dispersions Division of Eastman Chemical, Inc. (Kingsport, Tenn.).

The colorant which can be used with the coating composition of the present invention can also comprise a special effect composition or pigment. As used herein, a "special effect composition or pigment" refers to a composition or pigment that interacts with visible light to provide an appearance effect other than, or in addition to, a continuous unchanging color. Example special effect compositions and pigments include those that produce one or more appearance effects such as reflectance, pearlescence, metallic sheen, texture, phosphorescence, fluorescence, photochromism, photosensitivity, thermochromism, goniochromism, and/or color-change. Non-limiting examples of special effect compositions can include transparent coated mica and/or synthetic mica, coated silica, coated alumina, aluminum flakes, a transparent liquid crystal pigment, a liquid crystal coating, and combinations thereof.

The coating composition may include a rheology modifier to adjust the viscosity of the coating composition to a desired level. The rheology modifier may be a non-associative rheology modifier, such as an inorganic additive (e.g., clays) and hydroxyethyl cellulose (HEC). The rheology modifier may be an associative rheology modifier, such as a hydrophobically-modified ethylene oxide based urethane (HEUR) or a hydrophobically-modified alkali soluble emulsion (HASE). In some non-limiting examples, the coating composition may have a Stormer viscosity between 80-120 KU (as measured according to ASTM D562) and/or an ICI viscosity between 0.5-5 P (as measured according to ASTM D4287).

The coating composition may include a matting agent. The matting agent may include inorganic and/or organic matting agents. Suitable inorganic matting agents include silica, alumina silicate and/or calcium carbonate, with particle size less than 100 microns, such as below 10 microns, as measured using a SEDIGRAPH particle size analyzer from Micrometrics (Norcross, Ga.). Suitable organic matting agents include a wax, a thermoplastic polymer and/or a thermoset polymer, wherein the organic matting agent is different from the self-crosslinkable core-shell particles and the acrylic polymer. The matting agents should be present in the coating composition in an amount sufficient to confer low gloss to the coating, where low gloss is defined as Master Painters Institute (MPI) Gloss Levels 1 through 3 (matte finish, velvet-like finish, and eggshell finish, respectively) with a 60° gloss below 20 units and a 85° sheen below 35 units. This gloss value may be measured using a micro-TRI-gloss meter from BYK Gardner according to ASTM D523. In some examples, the pigment volume concentration (PVC) of the coating composition may be at least 35%, such as at least 50%.

Other non-limiting examples of further materials that can optionally be used with the coating composition of the present invention include plasticizers, abrasion resistant particles, anti-oxidants, hindered amine light stabilizers, UV light absorbers and stabilizers, surfactants, flow and surface control agents, thixotropic agents, catalysts, reaction inhibitors, and other customary auxiliaries. Depending on the volatile organic compounds (VOC) of such additional components, (particularly coalescing agents and/or plasticizers), the coating composition of the present invention may contain little or no VOC, such as below 50 g/L or below 25 g/L or below 5 g/L or none.

The coating composition of the present invention, when applied to a substrate and dried to form a coating, may improve stain resistance of the coating compared to the same coating composition that does not include the self-crosslinkable core-shell particles. Stain resistance is defined based on the stain resistance test method described in the below examples.

The present invention is also directed to a method of improving stain resistance of a substrate with the coating composition described herein. The method includes applying the coating composition described herein over at least a portion of the substrate. The coating composition can be applied in liquid form and dried, such as at temperature conditions in the range of −10° C. to 50° C.

Formulation of the coating composition involves the process of selecting and admixing appropriate coating ingredients in the correct proportions to provide a paint with specific processing and handling properties, as well as a final dry paint film with the desired properties. The coating composition may be applied to a substrate by conventional application methods such as, for example, brushing, roller application, and spraying methods such as, for example, air-atomized spray, air-assisted spray, airless spray, high volume low pressure spray, and air-assisted airless spray. Suitable substrates include, but are not limited to, architectural substrates, such as metallic or non-metallic substrates including: concrete, cement board, MDF (medium density fiberboard) and particle board, gypsum board, wood, stone, metal, plastics, wall paper, textile, plaster, fiberglass, ceramic, etc., which may be pre-primed by waterborne or solvent borne primers. The architectural substrate may be an interior wall of a building or residence. When applied to a substrate and dried to form a coating thereon, it has been found that the dried coating containing both the self-crosslinkable core-shell particles and the acrylic polymer along with the matting agent imparts stain resistance at low gloss levels.

EXAMPLES

The following examples are presented to demonstrate the general principles of the invention. The invention should not be considered as limited to the specific examples presented. All parts and percentages in the examples are by weight unless otherwise indicated.

Base Formulation

Coating compositions were prepared according to the Base Formulation in Table 1 with different resin blends, keeping the total resin solids constant by weight. The grind ingredients were mixed using a high-speed Cowles disperser at sufficient speed to create a vortex where the blade meets the materials. After addition of the matting agent, the grind process resumed for 20 minutes, followed by adding the letdown ingredients using a conventional lab mixer and mixing for 30 minutes after the last addition.

TABLE 1

| Component | Amount (g) |
|---|---|
| Grind | |
| Water | 100.0 |
| PANGEL S9[1] | 3.0 |
| TYLOSE HX 6000[2] YG4 | 2.0 |
| DREWPLUS ™ T-4507[3] | 2.0 |
| TAMOL ™ 731A[4] | 5.0 |
| ZETASPERSE 179[5] | 6.0 |
| MINEX 4[6] | 92.0 |
| Letdown | |
| Water | 71.0 |
| ACRYSOL RM-2020 NPR[7] | 17.0 |
| TRONOX CR-826S[8] | 387.0 |
| DREWPLUS ™ T-4507[3] | 8.0 |
| Resin blend | 430.0 |

TABLE 1-continued

| Component | Amount (g) |
|---|---|
| OPTIFILM enhancer 400[9] | 15.0 |
| ACTICIDE MBS[10] | 1.2 |

[1]Magnesium silicate rheology modifier, available from The Carey Company (Addison, IL).
[2]Hydroxyethylcellulose rheology modifier, available from SETylose USA (Plaquemine, LA).
[3]Mineral oil defoamer, available from Ashland (Columbus, OH).
[4]Dispersant available from The Dow Chemical Company (Midland, MI).
[5]Nonionic surfactant, available from Evonik Industries AG (Essen, Germany).
[6]Aluminum silicate matting agent, available from The Cary Company (Addison, IL).
[7]Hydrophobically modified ethylene oxide urethane rheology modifier, available from The Dow Chemical Company (Midland, MI).
[8]Rutile titanium dioxide slurry, available from Tronox Limited (Stamford, CT).
[9]Coalescent, available from The Eastman Chemical Company (Kingsport, TN).
[10]Biocide, available from Thor Specialties, Inc. (Shelton, CT).

Examples 1-6

Synthesis of Core-Shell Particles

Example 1

Part A: A polyurethane was first prepared by charging the following components in order into a four necked round bottom flask fitted with a thermocouple, mechanical stirrer, and condenser: 56 grams methyl methacrylate, 90 grams of butyl acrylate, 10 grams trimethylol propane, 12 grams of hydroxyethyl methacrylate (HEMA), 0.9 grams of 2,6-di-tert-butyl 4-methyl phenol, 182 grams of FOMREZ 55-56 (hydroxyl terminated saturated linear polyester polyol, commercially available from Chemtura Corporation (Middlebury, Conn.)) and 35 grams of dimethyol propionic acid (DMPA). The mixture was heated to 50° C. and held for 15 minutes. After heating the mixture, 180 grams of isophorone diisocyanate was charged into the flask over 10 minutes and mixed for 15 minutes. Next, 8.2 grams of butyl acrylate 1.3 g, triethylamine and 0.34 grams of dibutyl tin dilaurate (DBTDL) was charged into the flask. Immediate exotherm was observed. After exotherm subsided, the mixture was heated to 90° C. and held for 60 minutes. The mixture was then cooled to 70° C., and 80 grams methyl methacrylate and 19.8 grams of hexanediol diacrylate were charged into the flask. The mixture was kept at 60° C. before being dispersed into water.

Part B: A latex comprising polyurethane-acrylic core-shell particles was prepared by first charging the following components into a four necked round bottom flask fitted with a thermocouple, mechanical stirrer, and condenser: 450 grams of deionized water, 26 grams of diacetone acrylamide and 7.5 grams of ethylenediamine. The mixture was heated to 70° C. and held for 2 hours with an $N_2$ blanket. After heating the mixture, 26.8 grams adipic dihydrazide, 18.8 grams dimethyl ethanolamine, 1.0 gram ethylenediamine and 500 grams of deionized water were charged into the flask and held at 50° C. for 15 minutes. Next, 520 grams of the polyurethane prepared in part A was dispersed into the flask over 20 minutes and mixed for an additional 15 minutes. A mixture of 0.5 gram of ammonium persulfate and 40 grams of deionized water was charged into the flask. After exotherm, the mixture was then held at 60° C. for an additional hour. After being cooled to 40° C., 0.2 grams of FOAMKILL 649 (non-silicone defoamer, commercially available from Crucible Chemical Company (Greenville, S.C.)), 3.0 grams of ACTICIDE MBS (microbiocide formed of a mixture of 1,2-benzisothiazolin-3-one and 2-methyl-4-isothiazolin-3-one, commercially available from Thor GmbH (Speyer, Germany)), and 5 grams of deionized water were charged and mixed for an additional 15 minutes. The resulting latex had a solid content of 36.6%.

Example 2

Part A: A polyurethane was first prepared by charging the following components in order into a four necked round bottom flask fitted with a thermocouple, mechanical stirrer, and condenser: 69 grams methyl methacrylate, 77 grams of butyl acrylate, 10 grams trimethylol propane, 8 grams of hydroxyethyl methacrylate (HEMA), 0.9 grams of 2,6-di-tert-butyl 4-methyl phenol, 182 grams of FOMREZ 55-56 (hydroxyl terminated saturated linear polyester polyol, commercially available from Chemtura Corporation (Middlebury, Conn.)) and 35 grams of dimethyol propionic acid (DMPA). The mixture was heated to 50° C. and held for 15 minutes. After heating the mixture, 176 grams of isophorone diisocyanate was charged into the flask over 10 minutes and mixed for 15 minutes. Next, 8.2 grams of butyl acrylate, 1.3 grams triethylamine and 0.34 grams of dibutyl tin dilaurate (DBTDL) was charged into the flask. Immediate exotherm was observed. After exotherm subsided, the mixture was heated to 90° C. and held for 60 minutes. The mixture was then cooled to 70° C., and 80 grams methyl methacrylate and 19.8 grams of hexanediol diacrylate were charged into the flask. The mixture was kept at 60° C. before being dispersed into water.

Part B: A latex comprising polyurethane-acrylic core-shell particles was prepared by first charging the following components into a four necked round bottom flask fitted with a thermocouple, mechanical stirrer, and condenser: 450 grams of deionized water, 26 grams of diacetone acrylamide and 7.5 grams of ethylenediamine. The mixture was heated to 70° C. and held for 2 hours with an $N_2$ blanket. After heating the mixture, 26.8 grams adipic dihydrazide, 18.8 grams dimethyl ethanolamine, 1.2 grams ethylenediamine and 500 grams of deionized water were charged into the flask and held at 50° C. for 15 minutes. Next, 520 grams of the polyurethane prepared in part A was dispersed into the flask over 20 minutes and mixed for an additional 15 minutes. A mixture of 0.5 gram of ammonium persulfate and 40 grams of deionized water was charged into the flask. After exotherm, the mixture was then held at 60° C. for an additional hour. After being cooled to 40° C., 0.2 grams of FOAMKILL 649 (non-silicone defoamer, commercially available from Crucible Chemical Company (Greenville, S.C.)), 3.0 grams of ACTICIDE MBS (microbiocide formed of a mixture of 1,2-benzisothiazolin-3-one and 2-methyl-4-isothiazolin-3-one, commercially available from Thor GmbH (Speyer, Germany)), and 5 grams of deionized water were charged and mixed for an additional 15 minutes. The resulting latex had a solid content of 36.9%.

Example 3

Part A: A polyurethane was first prepared by charging the following components in order into a four necked round bottom flask fitted with a thermocouple, mechanical stirrer, and condenser: 81 grams methyl methacrylate, 65 grams of butyl acrylate, 6 grams trimethylol propane, 6 grams of hydroxyethyl methacrylate (HEMA), 0.9 grams of 2,6-di-tert-butyl 4-methyl phenol, 182 grams of FOMREZ 55-56 (hydroxyl terminated saturated linear polyester polyol, commercially available from Chemtura Corporation (Middlebury, Conn.)) and 35 grams of dimethyol propionic acid (DMPA). The mixture was heated to 50° C. and held for 15 minutes. After heating the mixture, 162 grams of isophorone diisocyanate was charged into the flask over 10 minutes and mixed for 15 minutes. Next, 8.2 grams of butyl acrylate, 1.3 grams triethylamine and 0.34 grams of dibutyl tin dilaurate (DBTDL) was charged into the flask. Immediate exotherm was observed. After exotherm subsided, the mixture was heated to 90° C. and held for 60 minutes. The mixture was then cooled to 70° C., and 80 grams methyl methacrylate and 19.8 grams of hexanediol diacrylate were charged into the flask. The mixture was kept at 60° C. before being dispersed into water.

Part B: A latex comprising polyurethane-acrylic core-shell particles was prepared by first charging the following components into a four necked round bottom flask fitted with a thermocouple, mechanical stirrer, and condenser: 450 grams of deionized water, 26 grams of diacetone acrylamide and 7.5 grams of ethylenediamine. The mixture was heated to 70° C. and held for 2 hours with an $N_2$ blanket. After heating the mixture, 26.8 grams adipic dihydrazide, 18.8 grams dimethyl ethanolamine and 500 grams of deionized water were charged into the flask and held at 50° C. for 15 minutes. Next, 520 grams of the polyurethane prepared in part A was dispersed into the flask over 20 minutes and mixed for an additional 15 minutes. A mixture of 0.5 gram of ammonium persulfate and 40 grams of deionized water was charged into the flask. After exotherm, the mixture was then held at 60° C. for an additional hour. After being cooled to 40° C., 0.2 grams of FOAMKILL 649 (non-silicone defoamer, commercially available from Crucible Chemical Company (Greenville, S.C.)), 3.0 grams of ACTICIDE MBS (microbiocide formed of a mixture of 1,2-benzisothiazolin-3-one and 2-methyl-4-isothiazolin-3-one, commercially available from Thor GmbH (Speyer, Germany)), and 5 grams of deionized water were charged and mixed for an additional 15 minutes. The resulting latex had a solid content of 36.7%.

Example 4

Part A: A polyurethane was first prepared by charging the following components in order into a four necked round bottom flask fitted with a thermocouple, mechanical stirrer, and condenser: 93 grams methyl methacrylate, 53 grams of butyl acrylate, 5 grams trimethylol propane, 5 grams of hydroxyethyl methacrylate (HEMA), 0.9 grams of 2,6-di-tert-butyl 4-methyl phenol, 182 grams of FOMREZ 55-56 (hydroxyl terminated saturated linear polyester polyol, commercially available from Chemtura Corporation (Middlebury, Conn.)) and 35 grams of dimethyol propionic acid (DMPA). The mixture was heated to 50° C. and held for 15 minutes. After heating the mixture, 158 grams of isophorone diisocyanate was charged into the flask over 10 minutes and mixed for 15 minutes. Next, 8.2 grams of butyl acrylate, 1.3 grams triethylamine and 0.34 grams of dibutyl tin dilaurate (DBTDL) was charged into the flask. Immediate exotherm was observed. After exotherm subsided, the mixture was heated to 90° C. and held for 60 minutes. The mixture was then cooled to 70° C., and 80 grams methyl methacrylate and 19.8 grams of hexanediol diacrylate were charged into the flask. The mixture was kept at 60° C. before being dispersed into water.

Part B: A latex comprising polyurethane-acrylic core-shell particles was prepared by first charging the following components into a four necked round bottom flask fitted with a thermocouple, mechanical stirrer, and condenser: 450 grams of deionized water, 26 grams of diacetone acrylamide and 7.5 grams of ethylenediamine. The mixture was heated to 70° C. and held for 2 hours with an N$_2$ blanket. After heating the mixture, 26.8 grams adipic dihydrazide, 18.8 grams dimethyl ethanolamine and 500 grams of deionized water were charged into the flask and held at 50° C. for 15 minutes. Next, 520 grams of the polyurethane prepared in part A was dispersed into the flask over 20 minutes and mixed for an additional 15 minutes. A mixture of 0.5 gram of ammonium persulfate and 40 grams of deionized water was charged into the flask. After exotherm, the mixture was then held at 60° C. for an additional hour. After being cooled to 40° C., 0.2 grams of FOAMKILL 649 (non-silicone defoamer, commercially available from Crucible Chemical Company (Greenville, S.C.)), 3.0 grams of ACTICIDE MBS (microbiocide formed of a mixture of 1,2-benzisothiazolin-3-one and 2-methyl-4-isothiazolin-3-one, commercially available from Thor GmbH (Speyer, Germany)), and 5 grams of deionized water were charged and mixed for an additional 15 minutes. The resulting latex had a solid content of 37.7%.

Example 5

Part A: A polyurethane was first prepared by charging the following components in order into a four necked round bottom flask fitted with a thermocouple, mechanical stirrer, and condenser: 69 grams methyl methacrylate, 77 grams of butyl acrylate, 16 g Silsurf A008up from Siltech Corporation (Toronto, Canada), 10 grams trimethylol propane, 8 grams of hydroxyethyl methacrylate (HEMA), 0.9 grams of 2,6-di-tert-butyl 4-methyl phenol, 182 grams of FOMREZ 55-56 (hydroxyl terminated saturated linear polyester polyol, commercially available from Chemtura Corporation (Middlebury, Conn.)) and 35 grams of dimethyol propionic acid (DMPA). The mixture was heated to 50° C. and held for 15 minutes. After heating the mixture, 181 grams of isophorone diisocyanate was charged into the flask over 10 minutes and mixed for 15 minutes. Next, 8.2 grams of butyl acrylate, 1.3 grams triethylamine and 0.34 grams of dibutyl tin dilaurate (DBTDL) was charged into the flask. Immediate exotherm was observed. After exotherm subsided, the mixture was heated to 90° C. and held for 60 minutes. The mixture was then cooled to 70° C., and 80 grams methyl methacrylate and 19.8 grams of hexanediol diacrylate were charged into the flask. The mixture was kept at 60° C. before being dispersed into water.

Part B: A latex comprising polyurethane-acrylic core-shell particles was prepared by first charging the following components into a four necked round bottom flask fitted with a thermocouple, mechanical stirrer, and condenser: 450 grams of deionized water, 26 grams of diacetone acrylamide and 7.5 grams of ethylenediamine. The mixture was heated to 70° C. and held for 2 hours with an N$_2$ blanket. After heating the mixture, 26.8 grams adipic dihydrazide, 18.4 grams dimethyl ethanolamine and 500 grams of deionized water were charged into the flask and held at 50° C. for 15 minutes. Next, 520 grams of the polyurethane prepared in part A was dispersed into the flask over 20 minutes and mixed for an additional 15 minutes. A mixture of 0.5 gram of ammonium persulfate and 40 grams of deionized water was charged into the flask. After exotherm, the mixture was then held at 60° C. for an additional hour. After being cooled to 40° C., 0.2 grams of FOAMKILL 649 (non-silicone defoamer, commercially available from Crucible Chemical Company (Greenville, S.C.)), 3.0 grams of ACTICIDE MBS (microbiocide formed of a mixture of 1,2-benzisothiazolin-3-one and 2-methyl-4-isothiazolin-3-one, commercially available from Thor GmbH (Speyer, Germany)), and 5 grams of deionized water were charged and mixed for an additional 15 minutes. The resulting latex had a solid content of 36.3%.

Example 6

Part A: A polyurethane was first prepared by charging the following components in order into a four necked round bottom flask fitted with a thermocouple, mechanical stirrer, and condenser: 69 grams methyl methacrylate, 77 grams of butyl acrylate, 16 grams Capstone AL62 (a linear telomere alcohol, including six perfluorinated carbon atoms and two nonfluorinated carbon atoms) from The Chemours Company (Wilmington, Del.), 10 grams trimethylol propane, 8 grams of hydroxyethyl methacrylate (HEMA), 0.9 grams of 2,6-di-tert-butyl 4-methyl phenol, 182 grams of FOMREZ 55-56 (hydroxyl terminated saturated linear polyester polyol, commercially available from Chemtura Corporation (Middlebury, Conn.)) and 35 grams of dimethyol propionic acid (DMPA). The mixture was heated to 50° C. and held for 15 minutes. After heating the mixture, 184 grams of isophorone diisocyanate was charged into the flask over 10 minutes and mixed for 15 minutes. Next, 8.2 grams of butyl acrylate, 1.3 grams triethylamine and 0.34 grams of dibutyl tin dilaurate (DBTDL) was charged into the flask. Immediate exotherm was observed. After exotherm subsided, the mixture was heated to 90° C. and held for 60 minutes. The mixture was then cooled to 70° C., and 80 grams methyl methacrylate and 19.8 grams of hexanediol diacrylate were charged into the flask. The mixture was kept at 60° C. before being dispersed into water.

Part B: A latex comprising polyurethane-acrylic core-shell particles was prepared by first charging the following components into a four necked round bottom flask fitted with a thermocouple, mechanical stirrer, and condenser: 450 grams of deionized water, 26 grams of diacetone acrylamide and 7.5 grams of ethylenediamine. The mixture was heated to 70° C. and held for 2 hours with an N$_2$ blanket. After heating the mixture, 26.8 grams adipic dihydrazide, 1,1 grams ethylenediamine, 18.4 grams dimethyl ethanolamine and 500 grams of deionized water were charged into the flask and held at 50° C. for 15 minutes. Next, 520 grams of the polyurethane prepared in part A was dispersed into the flask over 20 minutes and mixed for an additional 15 minutes. A mixture of 0.5 gram of ammonium persulfate and 40 grams of deionized water was charged into the flask. After exotherm, the mixture was then held at 60° C. for an additional hour. After being cooled to 40° C., 0.2 grams of FOAMKILL 649 (non-silicone defoamer, commercially available from Crucible Chemical Company (Greenville, S.C.)), 3.0 grams of ACTICIDE MBS (microbiocide formed of a mixture of 1,2-benzisothiazolin-3-one and 2-methyl-4-isothiazolin-3-one, commercially available from Thor GmbH (Speyer, Germany)), and 5 grams of deionized water were charged and mixed for an additional 15 minutes. The resulting latex had a solid content of 36.3%.

Examples 7-13

Stain Resistance Testing

The self-crosslinking polyurethane acrylate resins in Examples 1-6 were blended at 33% based on total resin solids with a Base Acrylic latex, RHOPLEX SG-30, available from The Dow Chemical Company (Midland, Mich.), as the "Resin Blend" in Table 1 in the Base Formulation to form the coating compositions for Examples 8-13, respectively, shown in Table 2. The coating composition of Comparative Example 7 is the Base Formulation with the "Resin Blend" in Table 1 being RHOPLEX SG-30.

Coatings obtained from the coating compositions for Examples 7-13 were subjected to stain resistance testing as described hereinafter.

The stain resistance test method is a more challenging, modified version of ASTM D4828 to target stain removal using fewer scrub cycles. Substrates were prepared by drawing down the coating compositions of Examples 7-13 onto black Leneta scrub panels (Form P121-10N) using a 7-mil horseshoe drawdown bar. The coating compositions were dried at ambient conditions for 7 days to form a cured coating, and then a stains were applied. The following stains were applied to the coatings via one-inch strips of filter paper saturated with the following fluids: red wine, grape juice, java concentrate, and hot coffee (70° C.). The following stains were directly applied to the coatings: mustard, red lipstick, green crayon, graphite powder, and Leneta staining medium ST-1. After 30 minutes, the lipstick and Leneta medium were wiped off, and the paint films were rinsed and placed in a washability machine (Gardner Abrasion Tester). A damp cellulosic sponge containing 10 grams of water and 6 grams of SOFT SCRUB (cleanser, Henkel AG & Company, KGaA (Düsseldorf, Germany)) was placed in a 1000 grams holder, and the panels were scrubbed for 6 cycles. After rinsing the panels and drying for at least 2 hours, each of the 9 stains was rated on an integer scale of 0 for no stain removal to 10 for complete stain removal. All stain resistance tests reported herein were run on the same day under the same conditions by the same operator.

The results of the stain resistance testing are shown in Table 2.

TABLE 2

| Stain | CE. 7 | Ex. 8 (Ex. 1) | Ex. 9 (Ex. 2) | Ex. 10 (Ex. 3) | Ex. 11 (Ex. 4) | Ex. 12 (Ex. 5) | Ex. 13 (Ex. 6) |
|---|---|---|---|---|---|---|---|
| Wine | 1 | 4 | 5 | 5 | 4 | 5 | 4 |
| Grape Juice | 4 | 8 | 9 | 8 | 8 | 8 | 9 |
| Java Concentrate | 5 | 7 | 9 | 5 | 5 | 5 | 7 |
| Hot Coffee | 2 | 0 | 1 | 1 | 2 | 1 | 7 |
| Mustard | 2 | 1 | 1 | 2 | 2 | 1 | 1 |
| Lipstick | 4 | 7 | 7 | 7 | 8 | 7 | 8 |
| Green Crayon | 9 | 9 | 9 | 9 | 9 | 9 | 9 |
| Graphite | 6 | 7 | 8 | 6 | 6 | 6 | 8 |
| Leneta Oil | 5 | 6 | 7 | 6 | 6 | 4 | 6 |
| Total | 38 | 49 | 56 | 49 | 50 | 46 | 59 |
| % Improvement | — | 29% | 47% | 29% | 32% | 21% | 55% |

Over 20% improvement in stain resistance was achieved using the coating compositions of Examples 8-13 compared to the coating composition of Comparative Example 7 (the Base Formulation with 100% RHOPLEX SG-30 based on total resin solids). The highest improvement in stain resistance, up to 55%, was observed for the inventive resin containing fluoro functionality in the urethane shell (Example 6).

The present invention further includes the subject matter of the following clauses:

Clause 1: A coating composition comprising: an aqueous dispersion of self-crosslinkable core-shell particles, wherein the core-shell particles comprise (1) a polymeric core at least partially encapsulated by (2) a polymeric shell comprising urethane linkages, keto and/or aldo functional groups, and hydrazide functional groups, wherein the polymeric core is covalently bonded to at least a portion of the polymeric shell, and an acrylic polymer, wherein the acrylic polymer is non-reactive with the polymeric core and the polymeric shell.

Clause 2: The coating composition of clause 1, wherein the polymeric core comprises an addition polymer derived from ethylenically unsaturated monomers.

Clause 3: The coating composition of clause 2, wherein the ethylenically unsaturated monomers comprise a (meth)acrylate monomer, a vinyl monomer, and/or a combination thereof.

Clause 4: The coating composition of any of clauses 1-3, wherein the polymeric shell comprises a water dispersible group.

Clause 5: The coating composition of any of clauses 1-4, wherein the core-shell particles are formed from a mixture of reactants comprising: (a) isocyanate-functional ethylenically unsaturated polyurethane prepolymers; (b) a Michael addition reaction product of ethylenically unsaturated monomers comprising a keto and/or aldo functional group, and a compound comprising at least two amino groups; (c) a hydrazide functional component; and (d) ethylenically unsaturated monomers.

Clause 6: The coating composition of any of clauses 1-5, wherein the polymeric core is completely free of keto and/or aldo functional groups.

Clause 7: The coating composition of any of clauses 1-6, wherein the acrylic polymer is added to the aqueous dispersion after formation of the core-shell particles.

Clause 8: The coating composition of any of clauses 1-7, comprising 10-50 wt % of the core-shell particles and 50-90 wt % of the acrylic polymer, based on total resin solids.

Clause 9: The coating composition of any of clauses 1-8, wherein the self-crosslinkable core-shell particles further comprise a fluorine-containing group and/or a silicon-containing group bonded to the polymeric shell.

Clause 10: The coating composition of any of clauses 1-9, wherein the polymeric core comprises a Tg of 0° C. to 50° C.

Clause 11: The coating composition of any of clauses 1-10, further comprising a rheology modifier.

Clause 12: The coating composition of any of clauses 1-11, further comprising a matting agent.

Clause 13: The coating composition of clause 12, wherein the coating composition comprises an effective amount of the matting agent such that when the coating composition is applied to a substrate and dried to form a coating, the coating exhibits a 60° gloss below 20 units and a 85° sheen below 35 units.

Clause 14: The coating composition of any of clauses 1-13, further comprising an inorganic pigment and/or filler.

Clause 15: The coating composition of any of clauses 1-14, wherein when the coating composition is applied to a substrate and dried to form a coating, the coating exhibits an improved stain resistance compared to the same coating composition not including the core-shell particles.

Clause 16: A substrate at least partially coated with a coating formed from the coating composition of any of clauses 1-15.

Clause 17: The substrate of clause 16, wherein the substrate comprises an architectural component.

Clause 18: The substrate of clause 16 or 17, wherein the substrate is non-metallic.

Clause 19: A method of improving stain resistance of a substrate comprising: preparing a coating composition by: preparing an aqueous dispersion of self-crosslinkable core-shell particles dispersed in an aqueous medium, wherein the core-shell particles comprise (1) a polymeric core at least partially encapsulated by (2) a polymeric shell comprising urethane linkages, keto and/or aldo functional groups, and hydrazide functional groups wherein the polymeric core is covalently bonded to at least a portion of the polymeric shell; and adding an acrylic polymer to the aqueous dispersion, wherein the acrylic polymer is non-reactive with the polymeric core and the polymeric shell; and applying the coating composition to a substrate.

Clause 20: The method of clause 19, wherein the acrylic polymer is added to the aqueous dispersion after formation of the core-shell particles.

Clause 21: The method of clause 19 or 20, wherein the coating composition comprises 10-50 wt % of the core-shell particles and 50-90 wt % of the acrylic polymer, based on total resin solids.

Whereas particular embodiments of this invention have been described above for purposes of illustration, it will be evident to those skilled in the art that numerous variations of the details of the present invention may be made without departing from the invention as defined in the appended claims.

The invention claimed is:

1. A coating composition comprising:
   an aqueous dispersion of self-crosslinkable core-shell particles, wherein the core-shell particles comprise (1) a polymeric core at least partially encapsulated by (2) a polymeric shell comprising urethane linkages, keto and/or aldo functional groups, and hydrazide functional groups, wherein the polymeric core is covalently bonded to at least a portion of the polymeric shell, and
   an acrylic polymer, wherein the acrylic polymer is non-reactive with the polymeric core and the polymeric shell.

2. The coating composition of claim 1, wherein the polymeric core comprises an addition polymer derived from ethylenically unsaturated monomers.

3. The coating composition of claim 2, wherein the ethylenically unsaturated monomers comprise a (meth)acrylate monomer, a vinyl monomer, and/or a combination thereof.

4. The coating composition of claim 1, wherein the polymeric shell comprises a water dispersible group.

5. The coating composition of claim 1, wherein the core-shell particles are formed from a mixture of reactants comprising: (a) isocyanate-functional ethylenically unsaturated polyurethane prepolymers; (b) a Michael addition reaction product of ethylenically unsaturated monomers comprising a keto and/or aldo functional group, and a compound comprising at least two amino groups; (c) a hydrazide functional component; and (d) ethylenically unsaturated monomers.

6. The coating composition of claim 1, wherein the polymeric core is completely free of keto and/or aldo functional groups.

7. The coating composition of claim 1, wherein the acrylic polymer is added to the aqueous dispersion after formation of the core-shell particles.

8. The coating composition of claim 1, comprising 10-50 wt % of the core-shell particles and 50-90 wt % of the acrylic polymer, based on total resin solids.

9. The coating composition of claim 1, wherein the self-crosslinkable core-shell particles further comprise a fluorine-containing group and/or a silicon-containing group bonded to the polymeric shell.

10. The coating composition of claim 1, wherein the polymeric core comprises a Tg of 0° C. to 50° C.

11. The coating composition of claim 1, further comprising a rheology modifier.

12. The coating composition of claim 1, further comprising a matting agent.

13. The coating composition of claim 1, further comprising an inorganic pigment and/or filler.

14. The coating composition of claim 1, wherein when the coating composition is applied to a substrate and dried to form a coating, the coating exhibits an improved stain resistance compared to the same coating composition not including the core-shell particles.

15. A substrate at least partially coated with a coating formed from the coating composition of claim 1.

16. The substrate of claim 15, wherein the substrate comprises an architectural component.

17. The substrate of claim 15, wherein the substrate is non-metallic.

18. A method of improving stain resistance of a substrate comprising:
   preparing a coating composition by:
      preparing an aqueous dispersion of self-crosslinkable core-shell particles dispersed in an aqueous medium, wherein the core-shell particles comprise (1) a polymeric core at least partially encapsulated by (2) a polymeric shell comprising urethane linkages, keto and/or aldo functional groups, and hydrazide functional groups wherein the polymeric core is covalently bonded to at least a portion of the polymeric shell; and
      adding an acrylic polymer to the aqueous dispersion, wherein the acrylic polymer is non-reactive with the polymeric core and the polymeric shell; and
   applying the coating composition to a substrate.

19. The method of claim 18, wherein the acrylic polymer is added to the aqueous dispersion after formation of the core-shell particles.

20. The method of claim 18, wherein the coating composition comprises 10-50 wt % of the core-shell particles and 50-90 wt % of the acrylic polymer, based on total resin solids.

* * * * *